US008511406B2

(12) United States Patent
Anasiewicz

(10) Patent No.: US 8,511,406 B2
(45) Date of Patent: Aug. 20, 2013

(54) MOTORIZED BEACH CART

(76) Inventor: Stephen A. Anasiewicz, Hopewell, NJ (US)

(*) Notice: Subject to any disclaimer, the term of this patent is extended or adjusted under 35 U.S.C. 154(b) by 211 days.

(21) Appl. No.: 12/929,015

(22) Filed: Dec. 22, 2010

(65) Prior Publication Data
US 2012/0160576 A1 Jun. 28, 2012

(51) Int. Cl.
B60L 11/00 (2006.01)
(52) U.S. Cl.
USPC .......................... 180/19.1; 180/65.6; 180/208
(58) Field of Classification Search
USPC ................. 180/19.1, 65.1, 65.6, 208
See application file for complete search history.

(56) References Cited

U.S. PATENT DOCUMENTS

| 2,740,484 | A |   | 8/1950  | Montana         |          |
|-----------|---|---|---------|-----------------|----------|
| 2,879,858 | A |   | 3/1959  | Thomas          |          |
| 3,146,824 | A |   | 9/1964  | Veilleux        |          |
| 3,266,813 | A |   | 8/1966  | Bosko et al.    |          |
| 3,370,664 | A |   | 2/1968  | Caplan          |          |
| 3,388,761 | A |   | 6/1968  | Arpin           |          |
| 3,896,893 | A | * | 7/1975  | Willis et al.   | 180/19.1 |
| 3,948,332 | A | * | 4/1976  | Tyner           | 180/19.1 |
| 4,106,583 | A |   | 8/1978  | Nemeth          |          |
| 4,289,212 | A | * | 9/1981  | Immel           | 180/19.1 |
| 4,538,695 | A | * | 9/1985  | Bradt           | 180/19.2 |
| 4,570,732 | A |   | 2/1986  | Craven          |          |
| 4,807,716 | A |   | 2/1989  | Hawkins         |          |
| 5,180,023 | A |   | 1/1993  | Reimers         |          |
| 5,232,065 | A |   | 8/1993  | Cotton          |          |
| 5,370,572 | A |   | 12/1994 | Lee             |          |
| 5,915,722 | A |   | 6/1999  | Thrasher et al. |          |
| 5,988,671 | A |   | 11/1999 | Abelbeck et al. |          |
| 6,276,471 | B1| * | 8/2001  | Kratzenberg et al. | 180/19.3 |
| 6,331,013 | B2|   | 12/2001 | Choi et al.     |          |
| 6,378,883 | B1|   | 4/2002  | Epstein         |          |
| 6,386,557 | B1|   | 5/2002  | Weldon          |          |
| 6,390,216 | B1|   | 5/2002  | Sueshige et al. |          |
| 7,017,691 | B2|   | 3/2006  | Lu              |          |

(Continued)

OTHER PUBLICATIONS

Amazon.com listing for non-motorized beach cart.

Primary Examiner — Kevin Hurley
(74) Attorney, Agent, or Firm — Roylance, Abrams, Berdo & Goodman, L.L.P.

(57) ABSTRACT

A motorized cart, including: a collapsible frame; a handle and a collapsible storage compartment connected to the frame; and at least three wheels, including a front wheel and two rear wheels disposed at a rear of the frame for rotating about a single axis. The cart also includes a drive compartment housing a battery, a drive controller, and at least one motor electrically connected to the battery and the drive controller for driving at least one of the rear wheels. The drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability. The drive compartment is shaped and positioned on the frame to not impede the collapsing of the storage compartment and the frame to a collapsed mode for compact storage of the cart, and to provide clearance for the at least one front wheel during transition between the collapsed mode and the expanded, upright mode. The drive compartment is positioned on the frame to substantially vertically align the center of gravity of the cart with the rear wheel rotation axis in a tilted mode, in which the cart operates only on the two rear wheels.

24 Claims, 10 Drawing Sheets

(56) References Cited

U.S. PATENT DOCUMENTS

| | | |
|---|---|---|
| 7,021,408 B2 | 4/2006 | Fricker |
| 7,055,847 B2 | 6/2006 | Miller et al. |
| 7,210,545 B1 | 5/2007 | Wald |
| 7,237,632 B2 | 7/2007 | Liao |
| 7,293,619 B2 | 11/2007 | Mitchell, Jr. |
| 7,451,848 B2 | 11/2008 | Flowers et al. |
| 7,490,684 B2 | 2/2009 | Seymour et al. |
| 7,537,069 B2 | 5/2009 | Kramer et al. |
| 7,735,587 B1 * | 6/2010 | Stahlnecker ................ 180/19.1 |
| 7,762,363 B1 | 7/2010 | Hirschfeld |
| 7,967,174 B2 | 6/2011 | Lauber |
| 7,984,916 B2 * | 7/2011 | Schwager ....................... 280/62 |
| 8,118,120 B2 * | 2/2012 | Flowers et al. .............. 180/19.1 |
| 8,286,739 B2 | 10/2012 | Oliphant |
| 8,365,850 B2 | 2/2013 | Gal et al. |
| 2004/0216933 A1 | 11/2004 | Coale |
| 2005/0252700 A1 * | 11/2005 | Kitauchi et al. ............. 180/65.1 |
| 2007/0131461 A1 * | 6/2007 | Treadwell et al. ........... 180/19.1 |
| 2008/0041644 A1 | 2/2008 | Tudek et al. |
| 2012/0118657 A1 * | 5/2012 | Liao .............................. 180/208 |
| 2012/0168237 A1 * | 7/2012 | Oliphant ...................... 180/65.1 |

* cited by examiner

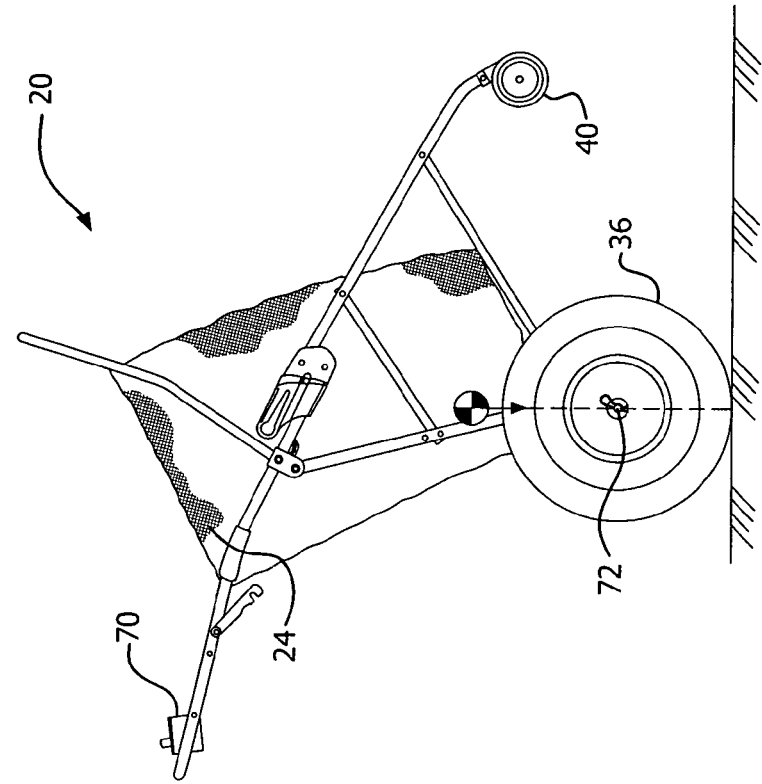
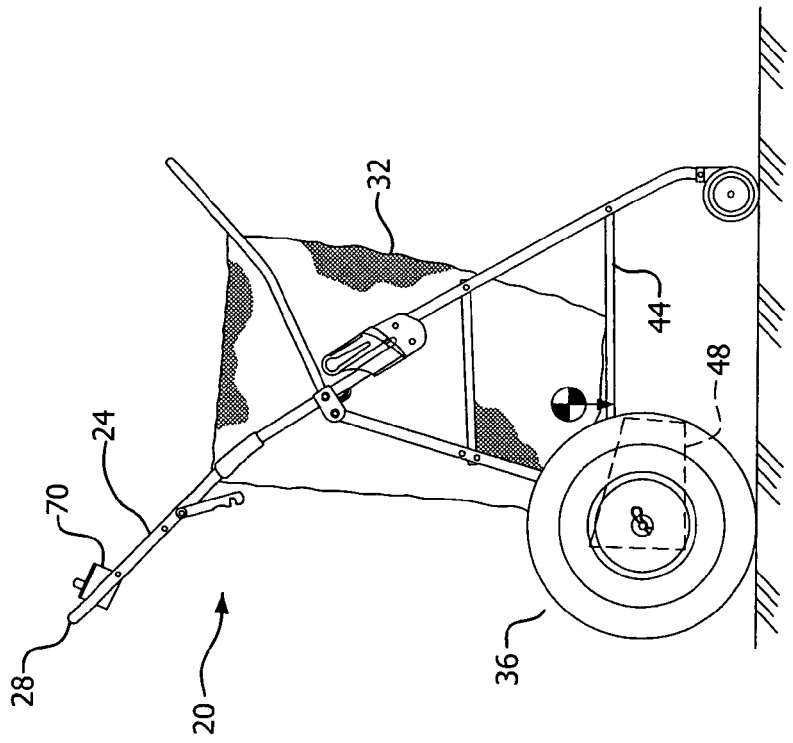

MOTORIZED BEACH CART

BACKGROUND OF THE INVENTION

1. Field of the Invention

The present invention relates generally to beach carts, and more particularly, to a motorized beach cart.

2. Description of the Related Art

Many beach-goers drive to parking lots relatively near the beach, and from there make many trips to ferry all the desired equipment, such as chairs, umbrellas, and coolers to the beach. Thus, a beach cart for carrying such items is desirable to reduce the number of trips. Such a cart, however, is typically transported in or on the car to and from the parking lot. Pushing and/or pulling such a cart, particularly if heavily laden, can be inconvenient. To ease the physical burden on the beachgoer, a motorized cart is desirable. Many examples of motorized carts are known, particularly with respect to motorized golf carts for carrying golf bags and clubs. But these carts lack features that are focused on the needs of beach cart users.

For example, U.S. Pat. No. 7,017,691 to Lu discloses a foldable motorized cart with a battery and a motor disposed directly on a base without being compartmentalized. In a beach environment, such exposed equipment would degrade quickly and could easily become clogged with sand. Additionally, although the cart is disclosed as having an attachable basket, in such a configuration the cart cannot be collapsed for storage.

U.S. Pat. No. 4,106,583 to Nemeth discloses a self-powered folding golf cart that has a battery housing that is disposed fairly high on the device and may pose stability issues. Additionally, although the front wheel and the rear legs are collapsible, the device lacks a collapsible storage compartment.

U.S. Patent Publication No. 2005/0252700 to Kitauchi et al. discloses a vehicle designed for carrying golf clubs in which wheels are used as fulcrums to tilt the vehicle for moving. But this device also lacks a collapsible storage compartment.

Motorized beach carts are also known, but lack features desired by beach-goers. U.S. Pat. No. 7,210,545 to Wald discloses a three-wheeled motorized cart with a propulsion assembly disposed beneath and supporting a front end of a cart platform that supports a tubular cargo frame assembly. The device lacks the ability to store compactly.

U.S. Pat. No. 7,762,363 to Hirschfeld discloses a motorized beach wagon that is convertible to a table. While convenient in these two configurations, this device is also not easily storable in a compact manner.

Further, to protect natural dunes and/or for erosion control, many beaches have raised boardwalks or sections thereof that require traversal of stairs to get to the beach. None of the above-noted carts are disclosed as capable of climbing stairs. Examples of known motorized stair climbing carts include U.S. Pat. No. 3,370,664 and U.S. Pat. No. 2,740,484. U.S. Pat. No. 3,370,664 to Caplan discloses a motorized stair-climbing cart with treads having recesses on the inside thereof that engage motor driven sprocket teeth. The treads also have outwardly extending lugs that engage the edges of stairs to climb the stairs. U.S. Pat. No. 2,740,484 to Montana discloses a motor driven stair climbing hand truck in which a climbing unit is selectively deployed from the chassis and power is disconnected from the driven traction elements, such as the wheels. The climbing unit includes climbing rollers that engage the stairs to lift the hand truck up the stairs. Both of these devices, however, require complex and/or expensive specialized equipment to provide the stair-climbing ability. Such equipment may not fare well in the salt and sand of the beach.

What is needed is a motorized beach cart that has a collapsible storage container and a collapsible frame for easy storage and transportation of the cart. Additionally, the cart should be stable, ruggedized, and adaptable to multiple transportation situations, including traversing sand and stairs.

SUMMARY OF EMBODIMENTS OF THE INVENTION

Accordingly, it is an aspect of the present invention to provide a motorized cart that is collapsible for easy storage and is stable in multiple configurations for differing transportation situations.

The foregoing and/or other aspects of the present invention are achieved by providing a motorized cart, including: a collapsible frame; a handle and a collapsible storage compartment connected to the frame; and at least three wheels, including a front wheel and two rear wheels disposed at a rear of the frame for rotating about a single axis. The cart also includes a drive compartment housing a battery, a drive controller, and at least one motor electrically connected to the battery and the drive controller for driving at least one of the rear wheels. The drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability. The drive compartment is shaped and positioned on the frame to not impede the collapsing of the storage compartment and the frame to a collapsed mode for compact storage of the cart, and to provide clearance for the at least one front wheel during transition between the collapsed mode and the expanded, upright mode. The drive compartment is positioned on the frame to substantially vertically align the center of gravity of the cart with the rear wheel rotation axis in a tilted mode, in which the cart operates on the two rear wheels.

The foregoing and/or other aspects of the present invention are also achieved by providing a method of manufacturing a motorized cart, including providing a collapsible frame and a collapsible storage compartment thereon, the frame and storage compartment being movable between a collapsed, storage mode and an expanded, upright mode; providing a pair of rear wheels on the frame, the cart being rotatable about an axis of rotation of the rear wheels; and providing at least one front wheel on the frame. The method also includes providing a drive compartment housing a battery, a drive controller, and at least one motor electrically connected to the battery and the drive controller for driving at least one of the rear wheels, the drive compartment being positioned on the frame and shaped to: substantially vertically align a center of gravity of the cart with the rear wheel rotation axis when the cart is in a tilted mode; position the center of gravity of the cart forward of the rear wheel rotation axis in the expanded, upright mode; and provide for clearance of the at least one front wheel during transition between the collapsed, storage mode and the expanded, upright mode. The method additionally includes providing controls on the frame for controlling speed and direction of travel.

The foregoing and/or other aspects of the present invention are also achieved by providing a kit for motorizing a cart having a handle, a collapsible frame and a collapsible storage compartment, and at least one front wheel. The kit includes a battery, a drive controller, at least one motor, at least one gear housing corresponding to the at least one motor, user controls, a pair of rear wheels connectable to the frame, an axle that serves as the axis of rotation of the rear wheels, and connecting means for connecting the rear wheels to the frame. The kit also includes a drive compartment for housing the battery, drive controller, and the at least one motor. The drive compartment is shaped to provide clearance for the front wheel during transition between a collapsed cart mode and an expanded, upright cart mode. The drive compartment is connectable to the frame so that a center of gravity of the cart is positioned forward of the rear wheel rotation axis when the cart is in the expanded, upright mode, the drive compartment does not impede collapsing of the storage compartment and the frame, and, the center of gravity of the cart is substantially vertically aligned with the rear wheel rotation axis in a tilted mode, in which the cart operates on the two rear wheels. The kit additionally includes cabling for electrically connecting the battery, the drive controller, the at least one motor, and the user controls, and attaching means for attaching the cabling to the frame. The rear wheels are connectable to the frame so that at least one of the pair of wheels is connectable with the at least one motor using the at least one gear housing.

Additional and/or other aspects and advantages of the present invention will be set forth in part in the description that follows and, in part, will be apparent from the description, or may be learned by practice of the invention.

BRIEF DESCRIPTION OF THE DRAWINGS

The above and/or other aspects and advantages of embodiments of the invention will become apparent and more readily appreciated from the following detailed description, taken in conjunction with the accompanying drawings, of which:

FIG. 11 is a right side view of the cart of FIG. 1 in the expanded, upright mode;

FIG. 12 is a right side view of the cart of FIG. 1 in a tilted mode;

DETAILED DESCRIPTION

Figure 2:
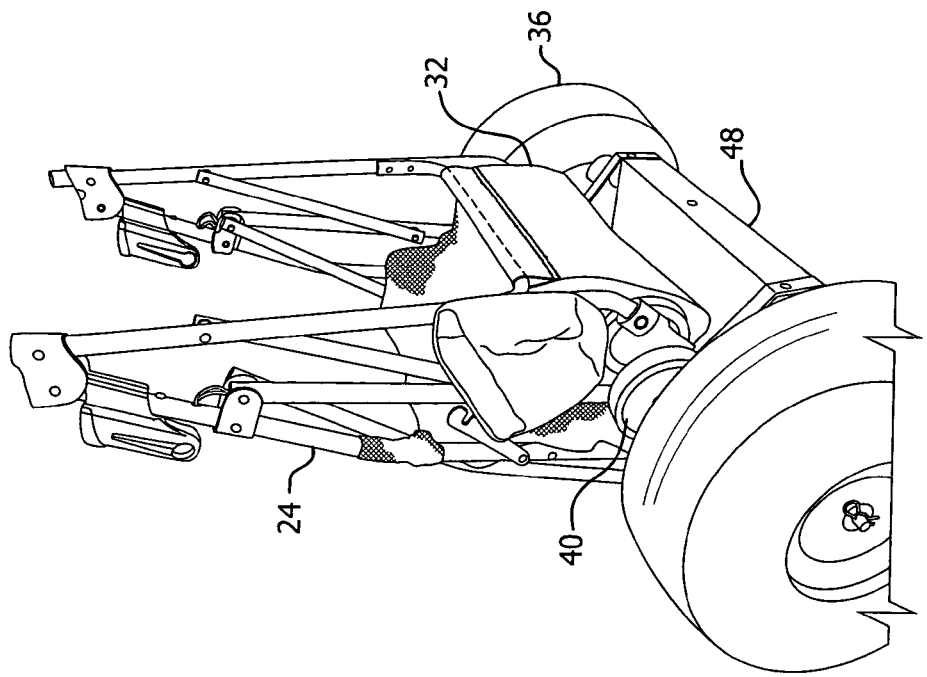
FIG. 2 is a perspective view of the cart of FIG. 1 in a collapsed mode.

Reference will now be made in detail to embodiments of the present invention, examples of which are illustrated in the accompanying drawings, wherein like reference numerals refer to the like elements throughout. The embodiments described herein exemplify, but do not limit, the present invention by referring to the drawings. As will be understood by one skilled in the art, terms such as up, down, bottom, and top are relative, and are employed to aid illustration, but are not limiting.

Figure 1:
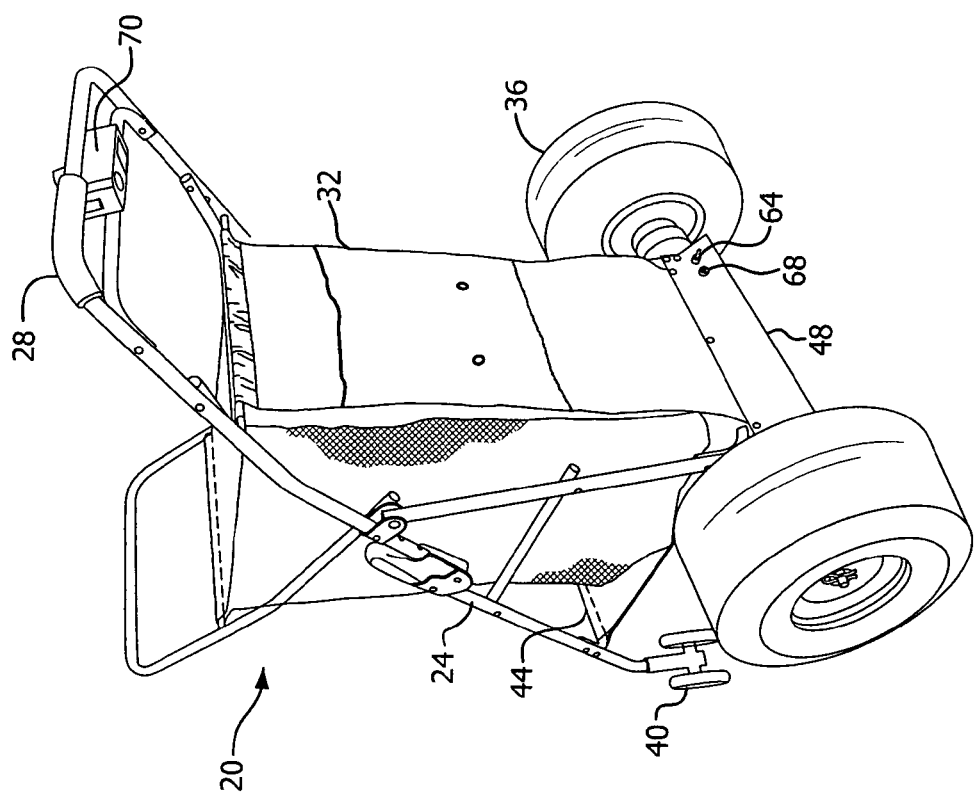
FIG. 1 is a perspective view of a motorized cart in an expanded, upright mode in accordance with an embodiment of the present invention.

FIG. 1 is a rear, left perspective view of a motorized cart 20 in an expanded, upright mode in accordance with an embodiment of the present invention. The cart 20 includes a frame 24, a handle 28 connected to the frame 24, and a storage compartment 32 connected to the frame 24. The cart 20 also preferably includes a pair of rear wheels 36 and two pairs of front wheels 40, all of which are connected to the frame 24. Each of the pairs of front wheels 40 includes a pair of wheels connected by an axle and forms a caster that is connected to the frame 24 and rotates about a substantially vertical axis when the cart 20 is in an expanded, upright mode. In addition, the cart 20 includes a collapsible shelf 44 at a lower portion thereof for holding larger items, for example, a cooler.

Further, the cart 20 includes a drive compartment 48 disposed on the frame 24 between the two rear wheels 36. The drive compartment 48 houses a battery 52, a drive controller 56, and a pair of motors 60 that are electrically connected to the battery 52 and the drive controller 56 (see FIG. 9). A main power switch 64 and a charging port 68 are preferably disposed on a rear of the drive compartment 48, as shown in FIG. 1. As discussed in greater detail below, the drive controller 56 is electrically connected to user controls 70 disposed on the handle 28

Figure 3:
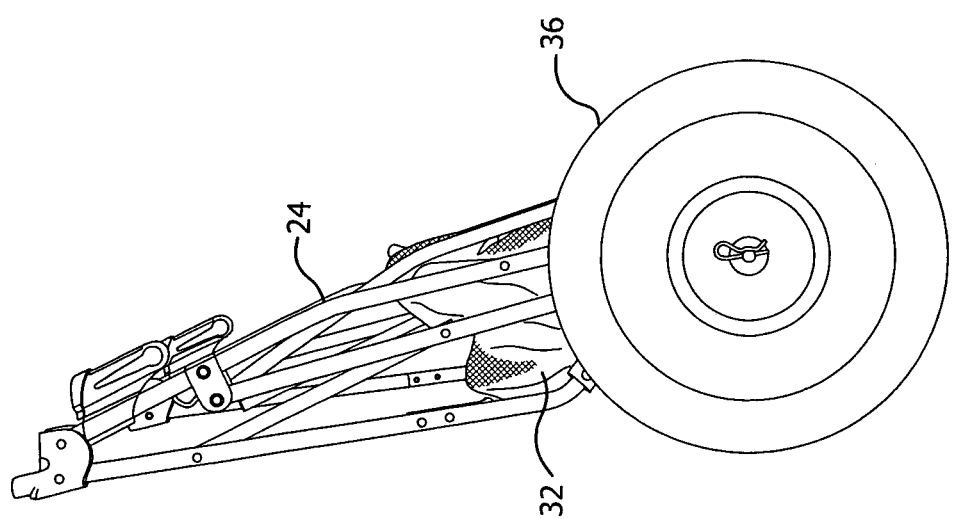
FIG. 3 is a left side view of the cart of FIG. 1 in the collapsed mode.

FIG. 2 is a front, right perspective view of the cart 20 and FIG. 3 is a left side view of the cart 20. In FIGS. 2 and 3, the cart 20 is in a collapsed mode. As shown in FIGS. 2 and 3, both the frame 24 and the storage compartment 32 are foldable, or collapsible to make the cart 20 smaller. In other words, in the collapsed mode, the size and/or the volume occupied by the cart is significantly reduced, thereby facilitating efficient storage and ease of transport. As will be described in greater detail below, as shown in FIG. 2, in the collapsed mode, the front wheels 40 are positioned adjacent to the drive compartment 48.

Figure 4:
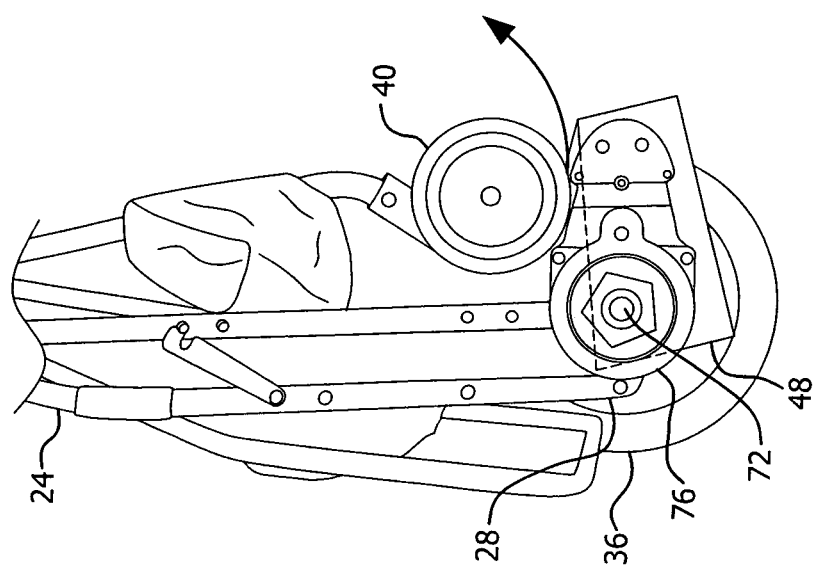
FIG. 4 is a partial right side view of the cart of FIG. 1.
Figure 5:
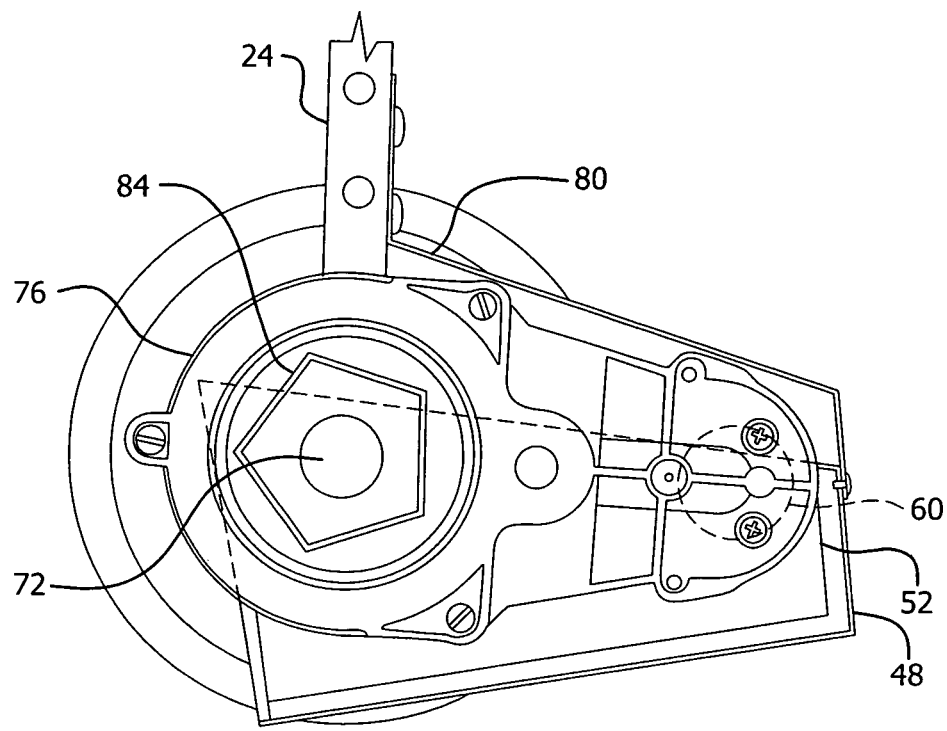
FIG. 5 is a partial perspective view of a right side of the cart of FIG. 1 illustrating a drive compartment.

The right rear wheel 36 is removed in FIG. 4 for clarity. As shown, in the collapsed mode, the front wheels 40 are positioned above and closely adjacent to the drive compartment 48, the outline of which is shown in a combination of solid and broken lines. Similarly, FIG. 5 illustrates an enlarged view of the drive compartment 48 with the outline shown in the combination of solid and broken lines. As shown in FIG. 4, when the front wheel 40 moves in or out of the collapsed mode (in other words, transitions between the collapsed mode to the expanded, upright mode) the shape and positioning of the drive compartment 48 provides clearance for the path of the front wheel 40.

Figure 6:
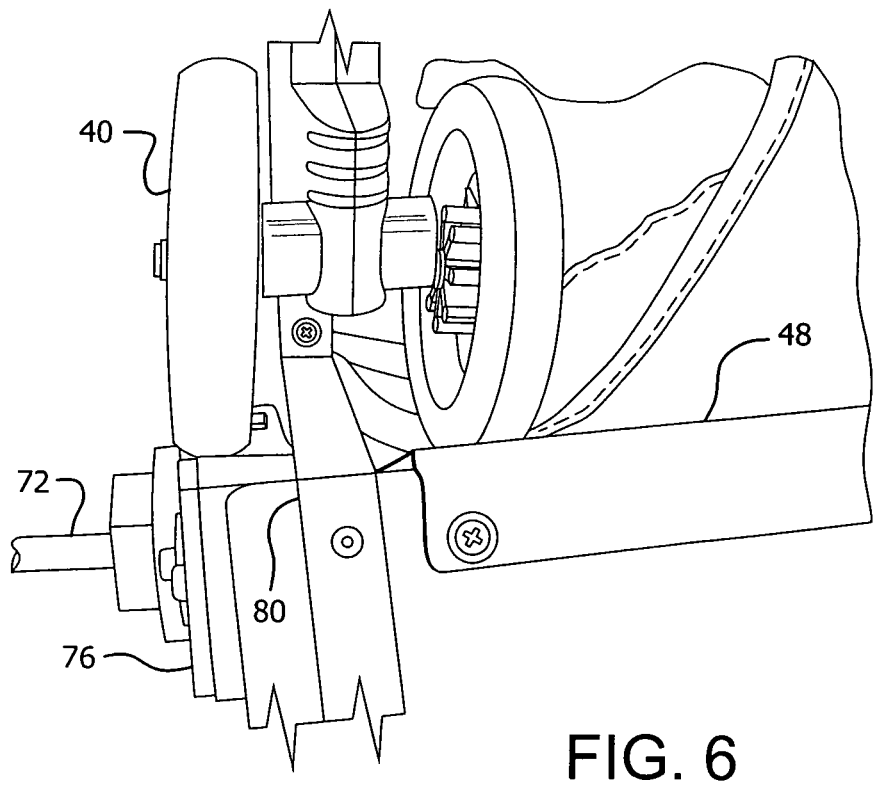
FIG. 6 is a partial perspective view of the cart of FIG. 1 in the collapsed mode illustrating a front wheel and the drive compartment.

In addition, as shown in FIGS. 4 and 5 and discussed in greater detail below, the cart 20 also includes an axle 72 connecting the rear wheels 36. The radial center of the axle 72 is the axis of rotation for the rear wheels 36. The axle 72 passes through a hole 74 (see FIG. 7) in a gear housing 76 that connects the motor 60 with the rear wheel 36. Further, as shown in FIG. 4, and more clearly in FIGS. 5 and 6, the drive compartment 48 preferably includes a strap 80 for connecting the drive compartment 48 to the frame 24. According to one embodiment, the strap 80 includes a pair of straps 80 disposed at lateral ends of the drive compartment 48. As shown in FIG. 6, when the cart 20 is in the collapsed mode, each pair of front wheels 40 straddles one of the straps 80. In other words, each of the pairs of front wheels 40 preferably has one wheel disposed on each lateral side of one of the straps 80. This configuration helps provide stable support of the drive compartment 48 with respect to the frame 24 and also provides for a compact posture of the cart 20 in the collapsed mode.

Figure 7:
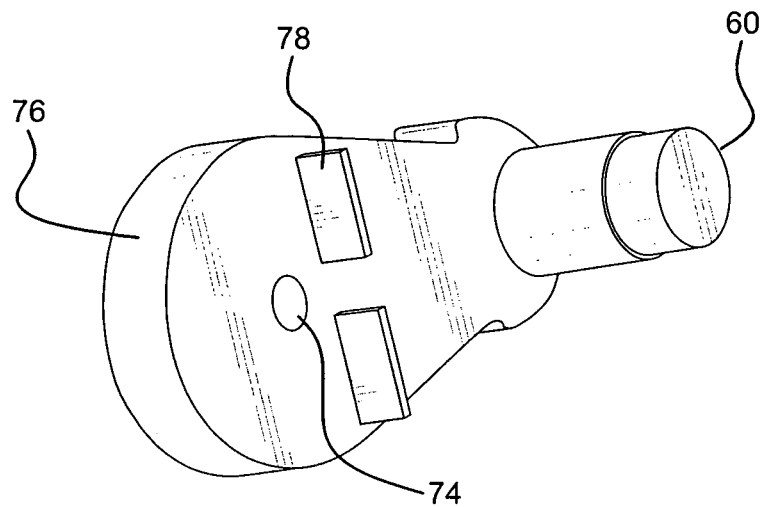
FIG. 7 is a perspective view of a motor and a gear housing of the cart of FIG. 1.

According to one embodiment, as shown in FIG. 7, the motor 60 is connected directly to the gear housing 76. Inside the gear housing 76, a series of gears intermesh between the motor 60 and a driving gear that is concentrically disposed with the hole 74 through which the axle 72 passes. The driving gear has a driving protrusion 84 (see FIG. 5) disposed thereon for driving the rear wheel 36. The driving protrusion 84 is best shown in FIG. 5, and is illustrated as being pentagonal. One skilled in the art will appreciate that other shapes may be used without departing from the scope of the invention. Examples of other shapes include triangles, squares, hexagons, radial spokes, etc. According to one embodiment, each of the rear wheels 36 is driven by a motor 60 connected with a gear housing 76. The gear housings 76 are disposed at lateral ends of the drive compartment 48. According to one embodiment, the gear housings 76 are only partially disposed within the drive compartment 48. Additionally, as discussed in greater detail below, according to one embodiment, the gear housing 76 includes a pair of engaging protrusions 78.

Figure 8:
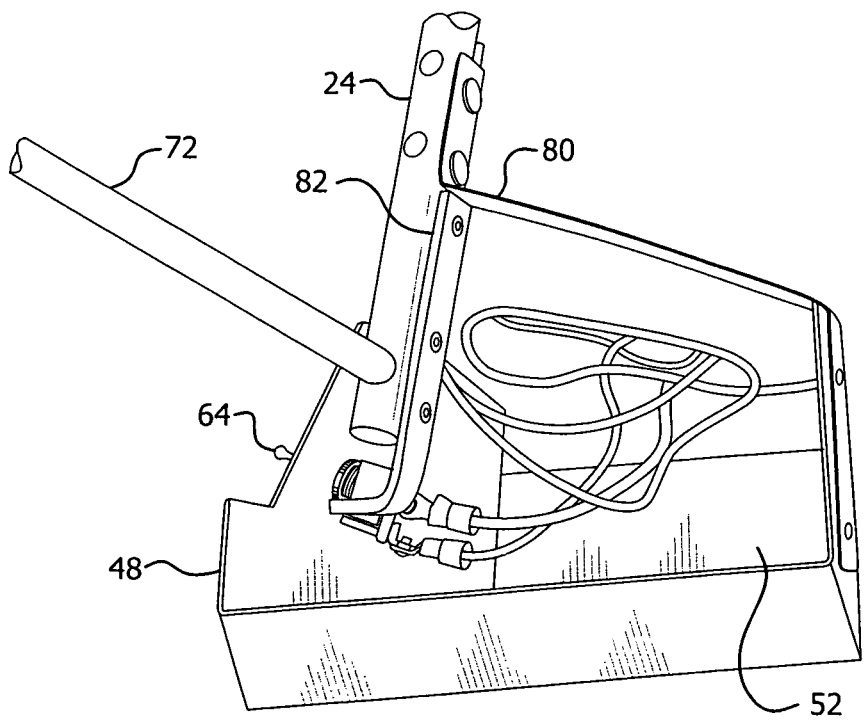
FIG. 8 is a partial perspective side view of the cart of FIG. 1 illustrating an interior of the drive compartment.

FIG. 8 is a partial perspective side view of the cart 20 illustrating an interior of the drive compartment 48. In FIG. 8, the rear wheel 36 and a top cover of the drive compartment 48 are removed for clarity. As shown, the cart 20 includes a gear housing bracket 82 disposed on the frame 24. According to on embodiment, the gear housing 76 is mounted so that the engaging protrusions 78 engage the gear housing bracket 82 to prevent the gear housing 76 from rotating with respect to the axle 72 and the frame 24.

Figure 9:
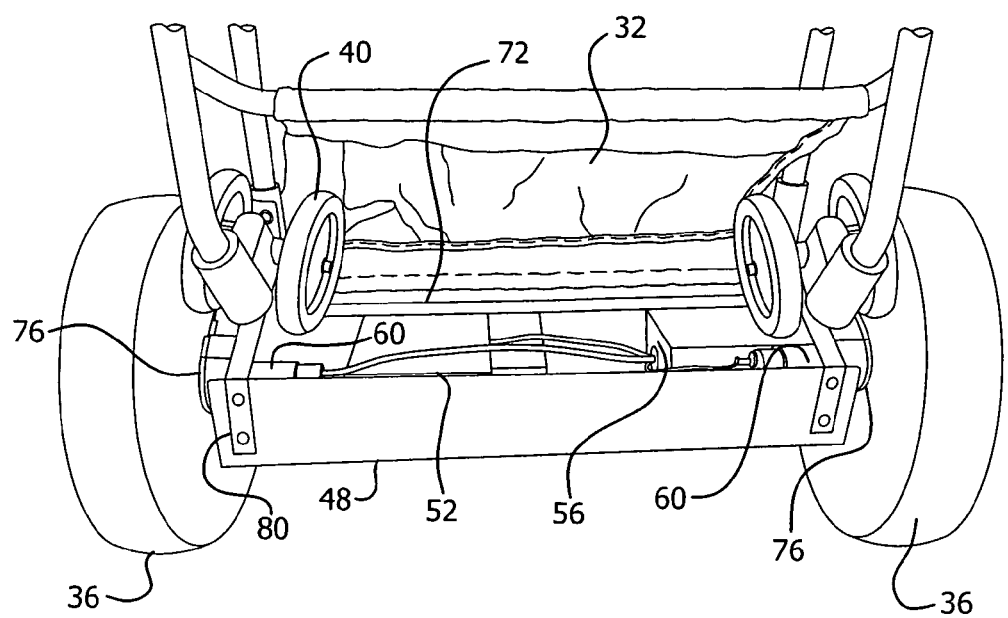
FIG. 9 is another partial perspective front view of the cart of FIG. 1 illustrating the interior of the drive compartment.

FIG. 9 is a partial perspective front view illustrating the interior of the drive compartment 48. In FIG. 9, the top cover of the drive compartment 48 is removed for clarity. As shown, the motors 60, the battery 52, and the drive controller 56 are disposed within the drive compartment 48. The motors 60 are electrically connected to the battery 52 and the drive controller 56. Although the cart 20 is illustrated in the collapsed mode in FIG. 9, the drive compartment 48 is positioned on the frame 24 so that in the expanded, upright mode (shown, for example, in FIG. 11), the battery 52, the drive controller 56, and the motors 60 are positioned below and forward of the axle 72. Such positioning of the drive compartment 48 helps to provide a low center of gravity for the cart, and thereby aids stability. According to one embodiment, the axle 72 passes through an upper portion of the drive compartment 48.

Figure 10:
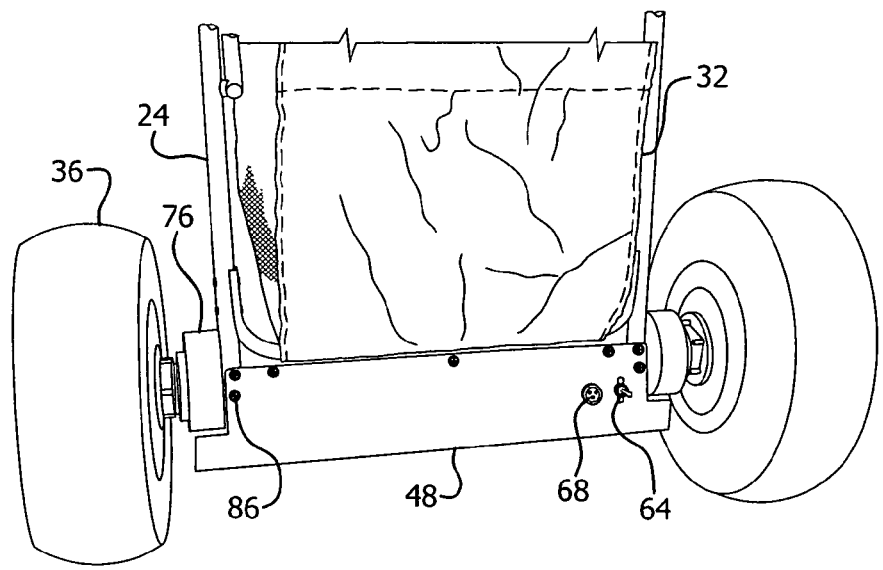
FIG. 10 is a partial perspective view illustrating a rear of the drive compartment of the cart of FIG. 1.

FIG. 10 illustrates a rear of the drive compartment 48. In addition to the above-mentioned straps 80, according to one embodiment, a rear portion of the drive compartment 48 is connected to the frame 24 by fasteners 86, such as screws. As shown, the main power switch 64 and the charging port 68 are easily accessible on the rear of the drive compartment 48. Such positioning of the main power switch 64, for example, allows a user to turn the cart 20 on and off with a foot, so that the user does not have to bend down. Moreover, as shown in FIG. 10, in addition to providing clearance for the path of the front wheel 40 during transition between the collapsed mode and the expanded, upright mode, the shape and positioning of the drive compartment 48 also provides significant ground clearance to accommodate traversing rough terrain and/or soft sand.

FIG. 11 illustrates the right side of the cart 20 in the expanded, upright mode, and FIG. 12 illustrates the right side of the cart 20 in a tilted mode. At least in part due to the positioning of the drive compartment and in the components housed therein, as shown in FIG. 11, in the expanded, upright mode, the center of gravity of the cart 20 is positioned forward of the rear wheel rotation axis. This configuration enhances the stability of the cart 20 in the expanded, upright mode. With all the wheels 36, 40 on the ground, the user can operate or drive the cart 20 in the expanded, upright mode. Preferably, however, the user drives the cart 20 in the tilted mode, as shown in FIG. 12. To transition from the expanded, upright mode to the tilted mode, with the axle 72 acting as a fulcrum, the user rotates the cart 20 about the axle 72 to lift the front wheels 40 off the ground and substantially vertically align the center of gravity of the cart 20 with the axle 72. According to one embodiment, at least in part due to the positioning of the drive compartment 48, the cart 20 can easily balance in the tilted mode without support from the user.

Figure 13:
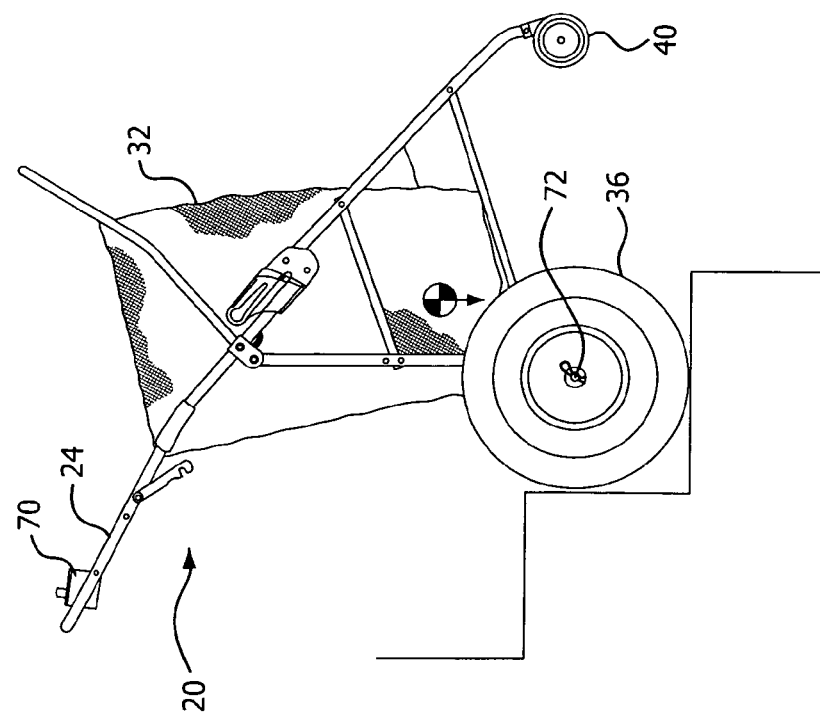
FIG. 13 is a right side view of the cart of FIG. 1 in a stair-climbing mode.

FIG. 13 illustrates the right side of the cart 20 in a two-wheeled stair climbing mode. The rear wheels 36 are sized, and the output of the motors 60 is designed so that the cart 20 can climb stairs under power. According to one embodiment, each of the motors has an output of about 12 volts and 170 Watts. In addition, according to one embodiment, the gearing ratio for the gear housing 76 from the rear wheel to the motor is about 123:1. The rise of standard stairs is usually around 6-9 inches and the tread of standard stairs is usually around 10 or 11 inches. According to one embodiment, the rear wheels 36 are about 14 inches in diameter and about 7 inches in width. In addition, as shown in FIG. 13, the drive compartment 48 is disposed on the frame 24 so that the center of gravity of the cart 20 is positioned slightly forward of the axle 72 in the stair climbing mode. This configuration requires the user to maintain contact and control of the cart 20 in the stair climbing mode. According to another embodiment, the rear wheels 36 are made of rubber and are about 5 inches in width and 13 inches in diameter.

Figure 14:
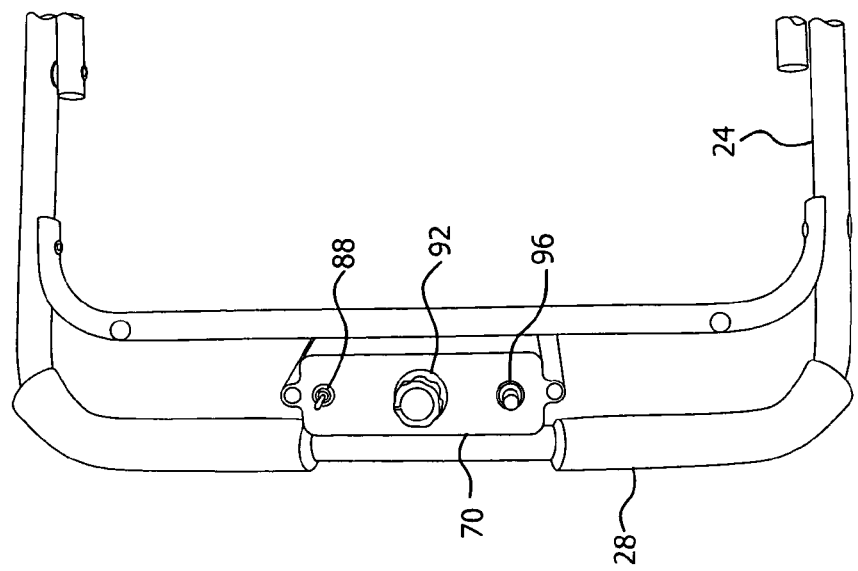
FIG. 14 is a perspective view of user controls of the cart of FIG. 1.

FIG. 14 is a perspective view of the user controls 70 of the cart 20. As noted above, the drive controller 56 is electrically connected to the user controls 70. According to one embodiment, wires connecting the drive controller 56 and the user controls 70 are disposed within the frame 24. As shown in FIG. 14, user controls 70 include a forward/reverse switch 88 and a speed controller 92. To use the forward/reverse switch 88, the user selects a desired direction of travel, either forward or reverse and sets the switch 88 to the desired direction. According to one embodiment, the speed controller 92 includes a rheostat 92. The user varies the setting of the rheostat 92 to change the output of the motors 60, and thus the speed of the cart 20. According to one embodiment, the user controls 70 also include an operate/brake controller 96. Additionally, according to one embodiment, the operate/brake controller 96 includes a single-pole push button 96. In operation, the user presses the single-pole push button 96 to drive the motors 60, and thus the cart 20. When the user releases the single-pole push button 96, the motors 60 cease driving the rear wheels 36. This configuration prevents the cart from running away from the user. Thus, in effect, the single-pole push button 96 operates as a dead man brake.

Figure 15:
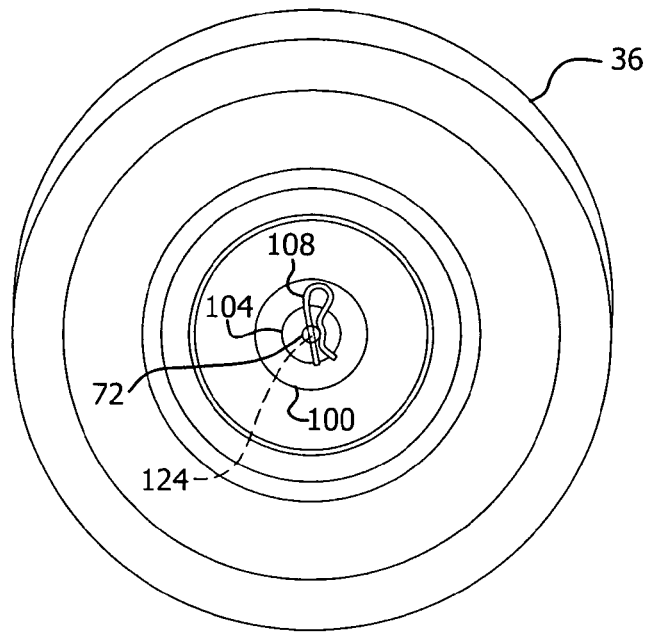
FIG. 15 is a perspective view of an outside of a quick-connect/disconnect feature of a wheel of the cart of FIG. 1.
Figure 16:
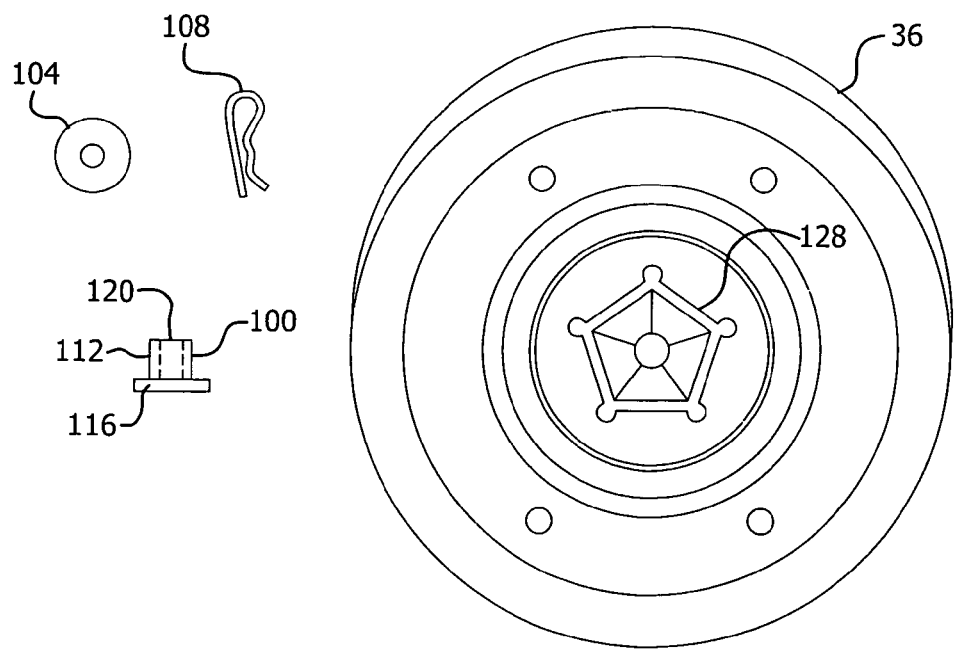
FIG. 16 is a perspective view of an inside of the quick-connect/disconnect feature of the wheel of the cart of FIG. 1.

FIGS. 15 and 16 respectively illustrate the outside and inside of one of the rear wheels 36. In one embodiment, the rear wheels 36 are made of a durable plastic. According to another embodiment, the rear wheels 36 are made of an elastomeric material, such as rubber. Further, according to one embodiment, each of the rear wheels 36 has a quick-connect/disconnect fitting for attaching the rear wheels 36 to the frame 24, and for detaching the rear wheels 36 from the frame to minimize a storage and/or transportation volume of the cart 20. According to one embodiment, the click-connect/disconnect fitting includes a hub 100, a washer 104, and a Cotter pin 108. The hub 100 includes a reduced diameter portion 112 and a flange portion 116 connected to the reduced diameter portion 112. The hub 100 also has a hole 120 disposed axially therethrough to accommodate the axle 72. As shown in FIG. 15, the axle 72 includes a Cotter pin hole 124 disposed radially therethrough to accommodate the Cotter pin 108.

Referring to the aforementioned driving protrusion 84 (shown, for example, in FIG. 5), according to one embodiment, as shown in FIG. 16, the quick-connect/disconnect fitting also includes a corresponding drive recess 128 centrally disposed on an inside of each of the rear wheels 36. As illustrated, the corresponding drive recess 128 is pentagonal to correspond with the driving protrusion 84. Like the driving protrusion 84, however, other shapes may be employed.

To assemble the rear wheels 36 to the frame 24, the user places one of the rear wheels 36 onto the axle 72, inserting the axle 72 through a central axial bore of the rear wheel 36, and connecting the corresponding drive recess 128 to the drive protrusion 84 although the drive protrusion 84 is illustrated as being disposed on the gear housing 76 and the corresponding drive recess 128 is illustrated as being disposed on the rear wheel 36, one skilled in the art will appreciate that the corresponding drive recess 128 may be disposed on the gear housing 76 and the drive protrusion 84 may be disposed on the rear wheel 36 without departing from the scope of the invention. According to one embodiment, the axle 72 is removable from the frame 24. In such an embodiment, the user must mount the axle 72 in the frame prior to putting the rear wheel 36 onto the axle 72.

Subsequent to mounting the rear wheel 36 on the axle 72, the user inserts the reduced diameter portion 112 of the hub 100 into the central axial bore of the rear wheel 36 until the flange portion 116 abuts the rear wheel 36, passing the axle 72 through the axial hole 120 of the hub 100. Next, the user places the washer over the axle 72 to about the flange portion 116 of the hub 100, and then inserts the Cotter pin 108 through the Cotter pin hole 124 of the axle, thereby securing the rear wheel 36 to the axle 72. The procedure is repeated on the other side of the cart 20 to secure the other rear wheel 36 to the axle 72. Disconnect the rear wheels 36 from the frame 24, the procedure is reversed.

Figure 17:
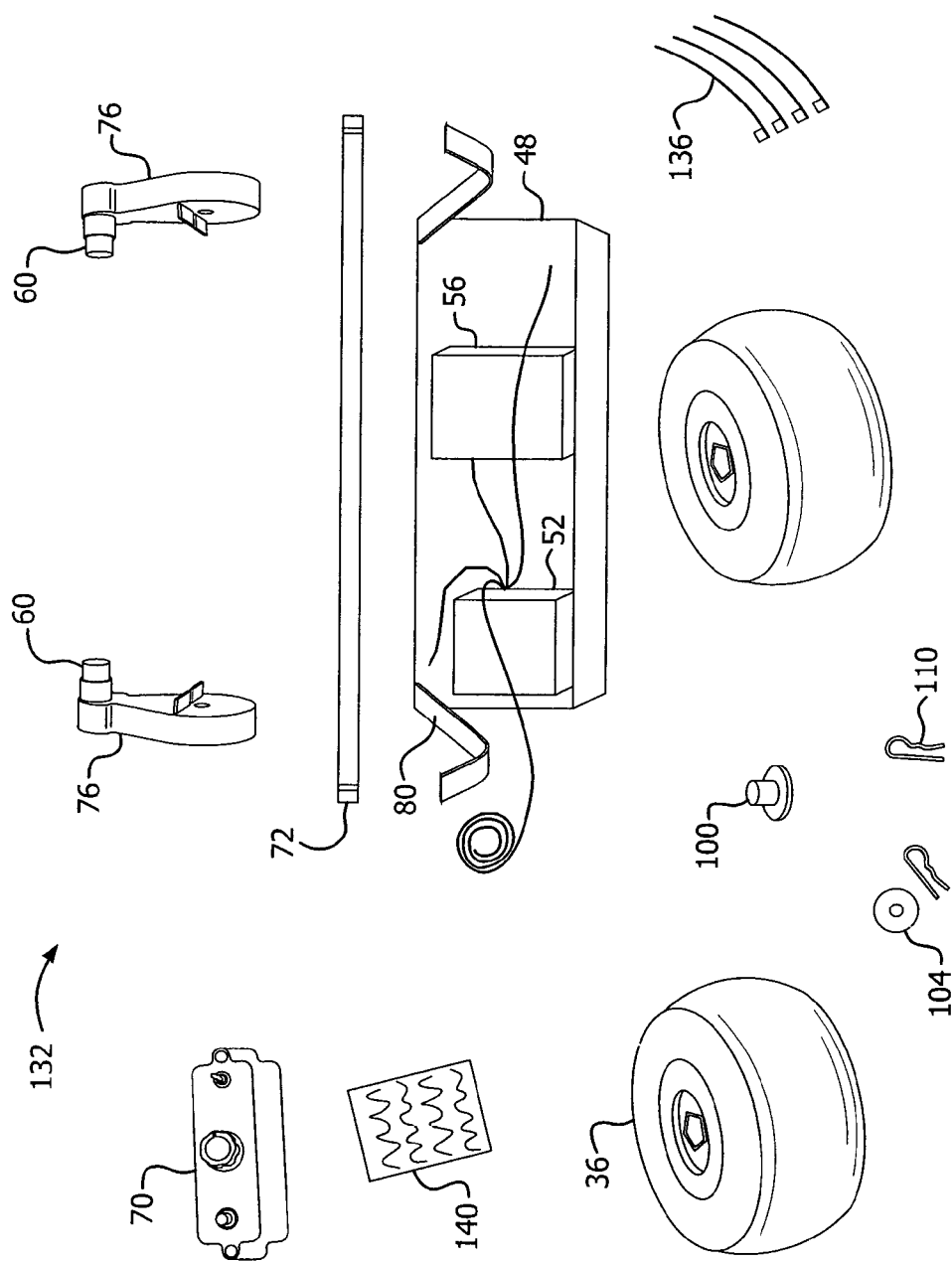
FIG. 17 is a perspective view of a kit for motorizing a cart in accordance with an embodiment of the present invention.

FIG. 17 is a perspective view of a kit 132 for motorizing a cart. According to one embodiment, the kit includes a battery 52, a drive controller 56, motors 60, gear housings 76, user controls 70, a pair of rear wheels 36, and an axle 72 to serve as the axis or rotation of the rear wheels 36. Additionally, the kit 132 includes connecting means for connecting the rear wheels to the frame of the cart. According to one embodiment, the connecting means includes a pair of hubs 100, a pair of washers 108, and a pair of cotter pins 110.

The kit 132 also includes a drive compartment 48 for housing the battery 52, drive controller 56, and the motors 60. The drive compartment 48 has a shape to provide clearance for the front wheels during transition between a collapsed cart mode and an expanded, upright cart mode. The drive compartment 48 is connectable to the frame 24 such that: the center of gravity of the cart 20 is positioned forward of the rear wheel rotation axis when the cart is in the expanded, upright mode; the drive compartment 48 does not impede collapsing of the storage compartment 32 and the frame 24; and the center of gravity of the cart 20 is substantially vertically aligned with the rear wheel rotation axis in the tilted mode, in which the cart 20 operates on the two rear wheels 36. The kit 132 further includes cabling 134 for electrically connecting the battery 52, the drive controller, 56, the motors 60, and the user controls 70. Further still, the kit 132 preferably includes attaching means 136 for attaching the cabling to the frame of the cart, for example, cable ties 136.

According to one embodiment, the kit 132 additionally includes instructions 140 for assembling the kit 132. The instructions 140 include instructions for mounting the user controls 70 on the handle of the cart and instructions for connecting the pair of rear wheels 36 to the frame, including instructions for connecting the pair of rear wheels 36 with the motors 60 using the gear housings 76. The instructions 140 also include instructions for mounting the drive compartment 48 to the frame of the cart, including: instructions for positioning the drive compartment 48 on the frame to position a center of gravity of the cart forward of the rear wheel rotation axis when the cart is in the expanded, upright mode; instructions to position the drive compartment 48 to not impede collapsing of the storage compartment and the frame; instructions to position the drive compartment 48 for clearance of the front wheels during transition between the collapsed mode and the expanded, upright mode; and instructions to position the drive compartment 48 to substantially vertically align the center of gravity of the cart with the rear wheel rotation axis in a tilted mode, in which the cart operates on the two rear wheels 36.

According to one embodiment of the kit 134, the battery 52, drive controller 56, and the motors 60 are pre-assembled in the drive compartment 48, and the motors 60 are electrically connected to the battery 52 and the drive controller 56.

Figure 18:
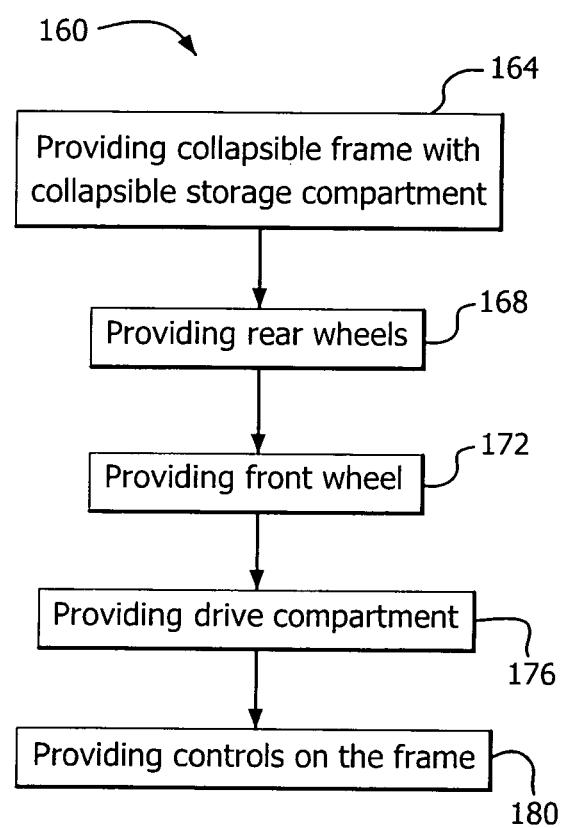
FIG. 18 is a flowchart illustrating a method of manufacturing a motorized cart.

FIG. 18 is a flowchart illustrating a method 160 of manufacturing a motorized cart. According to one embodiment, the method 160 includes an operation 164 of providing a collapsible frame and a collapsible storage compartment thereon, the frame and storage compartment being movable between a collapsed, storage mode and an expanded, upright mode. Another operation 168 of the method 160 is providing a pair of rear wheels on the frame, the cart being rotatable about an axis of rotation of the rear wheels. Additionally, the method 160 includes an operation 172 of providing at least one front wheel on the frame. The method also includes an operation 176 of providing a drive compartment housing a battery, a drive controller, and at least one motor electrically connected to the battery and the drive controller for driving at least one of the rear wheels. The drive compartment is positioned on the frame and shaped to: substantially vertically align a center of gravity of the cart with the rear wheel rotation axis when the cart is in a tilted mode; position the center of gravity of the cart forward of the rear wheel rotation axis in the expanded, upright mode; and provide for clearance of the at least one front wheel during transition between the collapsed, storage mode and the expanded, upright mode. The method further includes an operation 180 of providing controls on the frame for controlling speed and direction of travel.

Although only a few embodiments of the present invention have been shown and described, the present invention is not limited to the described embodiments. Instead, it will be appreciated by those skilled in the art that changes may be made to these embodiments without departing from the principles and spirit of the invention, the scope of which is defined by the claims and their equivalents.

What is claimed is:

1. A motorized cart, comprising:
a collapsible frame, the frame having a handle;
a collapsible storage compartment connected to the frame;
at least three wheels connected to the frame, the at least three wheels comprising two rear wheels disposed at a rear of the frame for rotating about a single axis and at least one front wheel positioned on the frame; and
a drive compartment for housing a battery, a drive controller, and at least one motor electrically connected to the battery and the drive controller for driving at least one of the rear wheels, wherein the drive compartment is positioned on the frame to position the battery, the drive controller, and the motor below and forward of the rear wheel rotation axis when the cart is in an expanded, upright mode, thereby positioning a center of gravity of the cart forward of the rear wheel rotation axis to enhance stability in the expanded, upright mode;
wherein the drive compartment is shaped and positioned on the frame to:
permit the collapsing of the storage compartment and the frame to a collapsed mode for compact storage of the cart, and
to provide clearance for the at least one front wheel during transition between the collapsed mode and the expanded, upright mode; and
wherein the drive compartment is positioned on the frame to substantially vertically align the center of gravity of the cart with the rear wheel rotation axis in a tilted mode, in which the cart operates on the two rear wheels.

2. The cart according to claim 1, wherein the drive compartment is positioned, the rear wheels are sized, and the output of the at least one motor is designed to provide a two-wheeled stair climbing mode in which the cart climbs stairs on the two rear wheels.

3. The cart according to claim 2, wherein the drive compartment and the storage compartment are disposed on the frame so that in the stair-climbing mode, the center of gravity of the cart is positioned forward of the rear wheel rotation axis.

4. The cart according to claim 1, wherein the at least three wheels remain in contact with the ground during the expanded, upright mode.

5. The cart according to claim 1, wherein the rear wheels each have a quick-connect/disconnect fitting for attaching to the frame and detaching from the frame for minimizing a storage volume of the cart.

6. The cart according to claim 1, further comprising user controls for controlling the motorized operation of the cart are positioned on the handle.

7. The cart according to claim 6, wherein the user controls comprise:
a forward/reverse controller; and
a speed controller.

8. The cart according to claim 7, wherein the user controls further comprise an operate/brake controller.

9. The cart according to claim 8, wherein the operate/brake controller comprises a single-pole push button.

10. The cart according to claim 1, further comprising gearing disposed between the at least one motor and the at least one driven wheel, wherein a portion of the gearing is concentrically disposed on the rear wheel rotation axis to engage and drive the at least one driven wheel.

11. The cart according to claim 10, further comprising an axle connecting the two rear wheels.

12. The cart according to claim 1, wherein in the collapsed mode, the at least one front wheel is positioned adjacent to the drive compartment.

13. The cart according to claim 12, wherein:
the drive compartment comprises a pair of straps for mounting the drive compartment on the frame; and
the at least one front wheel comprises two pairs of wheels;
in the collapsed mode, each pair of wheels straddles one of the straps.

14. A method of manufacturing a motorized cart, comprising:
providing a collapsible frame and a collapsible storage compartment thereon, the frame and storage compartment being movable between a collapsed, storage mode and an expanded, upright mode;
providing a pair of rear wheels on the frame, the cart being rotatable about an axis of rotation of the rear wheels;
providing at least one front wheel on the frame; and
providing a drive compartment for housing a battery, a drive controller, and at least one motor electrically connected to the battery and the drive controller for driving at least one of the rear wheels, the drive compartment being positioned on the frame and shaped to:
substantially vertically align a center of gravity of the cart with the rear wheel rotation axis when the cart is in a tilted mode,
position the center of gravity of the cart forward of the rear wheel rotation axis in the expanded, upright mode; and
provide for clearance of the at least one front wheel during transition between the collapsed, storage mode and the expanded, upright mode.

15. The method of claim 14, further comprising positioning the frame of the cart with respect to the rear wheel rotation axis to position the center of gravity of the cart forward of the rear wheel rotation axis in a stair-climbing mode.

16. The method of claim 14, further comprising providing an operate/brake control to operate the motor to drive the at least one rear wheel.

17. The method according to claim 14, further comprising providing a quick-connect/disconnect fitting for attaching the rear wheels to the frame.

18. The method according to claim 14, further comprising providing controls for installation on the frame for controlling speed and direction of travel.

19. A kit for motorizing a cart having a collapsible frame with a handle and a collapsible storage compartment, the frame having a first portion for mounting at least one front wheel, and a second portion for mounting at least one rear wheel, the kit comprising:
a drive compartment for housing a battery, a drive controller, and at least one motor, the drive compartment having an exterior surface, and at least one mounting surface for mounting the drive compartment on the second portion of the frame;
wherein when the drive compartment is mounted to the second portion of the frame:
the shape of the exterior surface adjacent to the front wheel during transition between a collapsed cart mode and an expanded provides clearance for the front wheel during the transition;
a center of gravity of the cart is positioned forward of a rear wheel rotation axis when the cart is in the expanded, upright mode,
the drive compartment does not impede collapsing of the storage compartment and the frame, and the center of gravity of the cart is substantially vertically aligned with the rear wheel rotation axis in a tilted mode, in which the cart operates on two rear wheels.

20. The kit according to claim 19, further comprising:
a battery;
a drive controller;
at least one motor;
at least one gear housing corresponding to the at least one motor;
at least one rear wheel connectable to the frame;
connecting means for connecting the at least one rear wheel to the frame;
an axle that serves as the axis of rotation of the at least one rear wheel;
user controls;
cabling for electrically connecting the battery, the drive controller, the at least one motor, and the user controls; and
attaching means for attaching the cabling to the frame;
wherein the rear wheels are connectable to the frame so that at least one of the pair of wheels is connectable with the at least one motor using the at least one gear housing.

21. The kit according to claim 18, further comprising instructions for mounting the user controls on the handle.

22. The kit according to claim 20, further comprising instructions for connecting the pair of rear wheels to the frame, including instructions for connecting at least one of the pair of wheels with the at least one motor using the at least one gear housing.

23. The kit according to claim 20, further comprising instructions for mounting the drive compartment to the frame, the instructions comprising:
   instructions for positioning the drive compartment on the frame to position a center of gravity of the cart forward of the rear wheel rotation axis when the cart is in the expanded, upright mode,
   instructions to position the drive compartment to not impede collapsing of the storage compartment and the frame,
   instructions to position the drive compartment for clearance of the front wheel during transition between the collapsed mode and the expanded, upright mode, and
   instructions to position the drive compartment to substantially vertically align the center of gravity of the cart with the rear wheel rotation axis in a tilted mode, in which the cart operates only on the two rear wheels.

24. The kit according to claim 20, wherein the battery, drive controller, and the at least one motor are pre-assembled in the drive compartment, the at least one motor being electrically connected to the battery and the drive controller.

* * * * *